United States Patent Office 3,709,983
Patented Jan. 9, 1973

3,709,983
CONTINUOUS PROCESS FOR SCRUBBING $H_2S$ FROM A GAS STREAM AND SELECTIVELY PRODUCING ELEMENTAL SULFUR
Robert J. J. Hamblin, Deerfield, Ill., assignor to Universal Oil Products Company, Des Plaines, Ill.
Continuation-in-part of application Ser. No. 802,356, Feb. 26, 1969, now Patent No. 3,594,125. This application July 19, 1971, Ser. No. 163,857
Int. Cl. C01b *17/04*
U.S. Cl. 423—573                                                        17 Claims

ABSTRACT OF THE DISCLOSURE $H_2S$ is removed from a gas stream and sulfur is produced by the steps of: (1) sequentially scrubbing the gas stream with a first recycle water stream containing $NH_4OH$ and then with a second recycle water stream which is substantially free of any $NH_4OH$ to produce a treated gas stream which is reduced $H_2S$ content and is substantially free of $NH_3$ and a rich absorbent stream containing $NH_4HS$; (2) catalytically reacting the rich absorbent stream with a first air stream to produce an effluent stream containing ammonium polysulfide; (3) catalytically reacting the resulting ammonium polysulfide-containing liquid stream with a second air stream at oxidizing conditions effective to produce liquid sulfur and a substantially sulfide-free water stream containing $NH_4OH$ and a minor amount of $(NH_4)_2S_2O_3$ (4) stripping $NH_3$ from at least a portion of this last water stream in order to produce a water stream which is substantially free of ammonia and sulfide; and (5) separately recycling a portion of the water stream formed in step (3) as the first recycle water stream and a portion of the water stream formed in step (4) as the second recycle water stream to the scrubbing step.

CROSS REFERENCES TO RELATED APPLICATIONS

This application is a continuation-in-part of my prior, copending application entitled "Removal and Recovery of Sulfur From A Gas Stream Containing $H_2S$" which was filed on Feb. 26, 1969 and assigned Ser. No. 802,356, now U.S. Pat. No. 3,594,125.

DISCLOSURE

The subject of the present invention is a novel, continuous process for conveniently and economically removing $H_2S$ from a gas stream, by sequentially scrubbing the gas stream with an ammoniacal absorbent stream and with an ammonia-free absorbent stream, to form a sulfide-rich absorbent stream without contaminating the treated gas stream with $NH_3$ and for recovering elemental sulfur from the resulting rich absorbent stream while continuously regenerating the two absorbent streams. More precisely, the present invention is based on my finding of a convenient and simple method for treating a water stream containing $NH_4HS$ to produce elemental sulfur and two water streams: one containing $NH_4OH$ and one substantially free of $NH_4OH$, coupled with my recognition that an $H_2S$-scrubbing step can be conveniently and simply interconnected with this treating method by means of these two water streams to enable the continuous and efficient scrubbing of a gas stream containing $H_2S$ without contaminating the treated gas stream with substantial amounts of $NH_3$.

The removal of $H_2S$ from a gas stream is a problem that has long confronted and challenged workers in many diverse industries. One example is in the natural gas industry where the $H_2S$ content of certain gas streams recovered from natural gas deposits in many areas of the world is often too high for commercial acceptance. Another example is in the manufactured gas industry or the coke-making industry where coal gas containing unacceptable amounts of $H_2S$ is commonly produced by the destructive distillation of bituminous coal having a high sulfur content. Yet another example is found in the manufacture of water gas or synthesis gas where it is not unusual to produce gas streams containing $H_2S$ by passing steam over a bed of incandescent coke or coal containing a minor amount of sulfur.

More frequently, this problem is encountered in the petroleum refining industry because the principal raw material used, crude oil, typically contains a minor amount of sulfur—principally in the form of organic sulfur compounds. During the course of the many processes to which the crude oil or fractions thereof are subjected, one or more gas streams containing $H_2S$ are quite commonly produced. For example, in many cases one of the product streams from a hydrocarbon conversion process is a gas stream containing $H_2S$ in admixture with hydrogen and/or with light normally gaseous hydrocarbons—mainly, $C_1$–$C_3$. As is well known in the art, the presence of $H_2S$ in these refinery gas streams can cause a number of detrimental problems in subsequent processing steps such as: corrosion of process equipment, deterioration and deactivation of catalysts, undesired side reactions, increases in process pressure requirement, increase in gas compressor capacity, etc.

Regardless of the source of the gas stream containing $H_2S$, the problem of removing $H_2S$ therefrom has been solved in a number of different ways which generally involve one or more of the following techniques: selective absorption with a wide variety of absorbents, adsorption by a suitable solid adsorbent, selective reaction with a reagent which produces an easily separable product, etc. The details of these techniques are well known to those skilled in the art. One old and well known solution to this $H_2S$ removal problem involves scrubbing the gas stream with an ammoniacal aqueous solution. For example, in Germany the Perox process, which uses ammonia scrubbing, has been widely used for coal gas purification. Despite the considerable amount of effort that has been devoted to developing an acceptable solution to this problem involving scrubbing with an ammoniacal solution, the use of ammoniacal scrubbing has not been universally accepted in the gas treating art as the preferred method for removing $H_2S$ from a gas stream primarily because of a number of operational difficulties associated with its implementation. One difficulty involves the relatively high partial pressure of ammonia at preferred scrubbing temperatures which generally requires that the scrubbing step be conducted with relatively dilute ammonia solutions or under relatively high pressure. The use of dilute scrubbing solutions in turn quite commonly forces the addition of a separate water wash step after the ammonia scrubbing step in order to remove ammonia from the treated gas stream. In addition, the use of dilute scrubbing solutions typically increases substantially the regeneration costs where the regeneration step is conducted at a considerably higher temperature than the scrubbing step, although some of this heat load can be recovered by a suitable heat exchanging procedure. Another difficulty is associated with the regeneration of the rich absorbent solution withdrawn from the $H_2S$-scrubbing step. In order to minimize the requirements of the scrubbing step for water and ammonia, it is necessary to remove sulfide from this rich absorbent. Several regeneration procedures have been proposed but they typically have involved the use of absorbent-soluble catalysts such as hydroquinone and have had problems such as contamination of the sulfur product with the catalyst, excessive formation of undesired by-products such as ammonium sulfate and thiosulfate and loss of scrubbing solution and catalyst during the periodic purges that are generally required to remove side products from the system. Other difficulties have been associated with the recovery of the elemental sulfur from the regeneration step where in some processes it has been customary to form a froth of sulfur in the absorbent regeneration vessel which then must be skimmed off and filtered. In short, it is clear that there are a significant number of technical problems associated with the prior art methods for removing $H_2S$ from a gas stream by the method of scrubbing with an ammoniacal solution.

As a result of my investigations of methods of treating water streams containing $NH_4HS$, I disclosed in my prior application a new approach to the use of ammonia scrubbing for the solution of this $H_2S$ removal problem which approach overcomes many of the difficulties experienced in the prior art. The basic concept of my approach involves the continuous production in the regeneration section via a simple, economic procedure of two separate recycle water streams, one containing $NH_4OH$ and one substantially free of $NH_4OH$ and the interconnection of the $H_2S$-scrubbing step and the regeneration section by means of these two recycle streams in a manner that minimizes the amount of ammonia carried out of the system via the treated gas stream. In my prior application, I disclosed a solution to the problem of scrubbing an $H_2S$-containing gas stream with an ammoniacal solution wherein the sour gas stream was scrubbed with the two separate scrubbing streams, one containing $NH_4OH$ and one substantially free of $NH_4OH$, to form a rich absorbent solution containing $NH_4HS$. According to the disclosed solution, the rich absorbent solution was continuously regenerated by contacting it with a solid catalyst in the presence of oxygen at oxidizing conditions resulting in the formation of a solution containing ammonium polysulfide followed by thermal decomposition of the ammonium polysulfide to form an elemental sulfur product and produce the two recycle scrubbing streams. I have now ascertained that the scrubbing process disclosed in my prior application can be substantially improved by selectively oxidizing the ammonium polysulfide solution to form liquid sulfur and a substantially sulfide-free water stream which then can be easily treated to yield the two recycle water streams necessary for the operation of the $H_2S$-scrubbing step. This approach eliminates the step of thermally decomposing ammonium polysulfide with its attendant high utility requirements and necessity for rather large recycle of unreacted sulfide and substitutes a straightforward, selective catalytic oxidation of the ammonium polysulfide to elemental sulfur. This modification of my prior process results in an improved process which has the following advantages: (1) the sulfur product is liquid and is not contaminated with detrimental salts; (2) the ammonia lost from the system in the treated gas stream is held to extremely low levels; (3) the scrubbing solution is not highly corrosive and metallurgy problems are minimized; (4) the catalyst utilized in the two oxidation steps are highly selective thereby minimizing undesired by-products; (5) only a minimum amount of water is evaporated in the regeneration section thereby holding heat loads to minimum levels; (6) the selectivity for elemental sulfur on a per pass basis, is quite high, approaching 95% yield of elemental sulfur, thereby minimizing sulfide recycle in the regeneration section; (7) the requirements of the resulting process for water is minimized by the use of recycle water streams and by the fact that water is one of the products of the oxidation reactions in the regeneration section; and (8) catalyst losses in the product sulfur stream are eliminated.

It is, accordingly, a principal object of the present invention to provide an improvement in a process for removing $H_2S$ from a gas stream with an ammoniacal solution wherein the regeneration of the rich absorbent solution involves selective oxidation of sulfide to elemental sulfur. Another object is to provide a simple procedure for minimizing the amount of reboil heat which must be utilized in the regeneration section of such a process. Yet another object is to provide a simple technique from removing $H_2S$ from a gas stream with an ammoniacal solution with subsequent regeneration of the rich absorbent stream to yield elemental sulfur and regenerated absorbent stream. Still another object is to provide a process for scrubbing $H_2S$ from a gas stream which is relatively simple, effective and economical because the absorbent utilized is continuously and efficiently regenerated.

If brief summary, the present invention is a continuous, closed-loop process for treating a gas stream containing $H_2S$ and for producing elemental sulfur therefrom. In the first step of the process the input gas stream is introduced into the lower region of a first gas scrubbing zone which is typically a vertically positioned tower containing suitable gas-liquid contacting means. Also in this first step a first recycle water stream contacting $NH_4OH$ is introduced into the middle region of this first scrubbing zone and a second recycle water stream which is substantially free of ammonia and sulfide is introduced into this scrubbing zone above the point of introduction of the first recycle water stream. According to the second step, this first scrubbing zone is maintained at countercurrent gas-liquid contracting conditions selected to produce a gaseous overhead stream which is substantially reduced in $H_2S$ content and is substantially free of $NH_3$ and an aqueous bottom stream, the rich absorbent stream, containing $NH_4HS$ and in most cases $NH_4OH$. In the next step, a mixture of the aqueous bottom stream from this first scrubbing zone, a first air stream and a third recycle water stream containing $(NH_4)_2S_2O_3$, $NH_4OH$ and $NH_4HS$ is reacted, in a first reaction zone, with a solid catalyst at oxidation conditions selected to form an effluent stream containing ammonium polysulfide, $(NH_4)_2S_2O_3$, $NH_4OH$, $H_2O$ and $N_2$ and in many cases unreacted $NH_4HS$. The effluent stream from this first reaction step is then separated, in a first conventional gas-liquid separating zone, into a gas stream containing $N_2$, $H_2O$, $H_2S$ and $NH_3$ and a liquid stream containing ammonium polysulfide, $NH_4OH$, $H_2O$ and $(NH_4)_2S_2O_3$. In the second reaction step, the liquid stream from the first gas-liquid separating zone and a second air stream are reacted with a solid catalyst at oxidizing conditions, including a temperature greater than or equal to the melting point of sulfur and a pressure sufficient to maintain this liquid stream in the liquid state, selected to form a liquid sulfur stream and an effluent stream containing $(NH_4)_2S_2O_3$, $NH_4OH$, $H_2O$ and $N_2$. After this second reaction step, the effluent stream therefrom is separated, in a second gas-liquid separating zone, into a gas stream containing $N_2$, $H_2O$ and $NH_3$ and a substantially sulfide-free water stream containing $(NH_4)_2S_2O_3$ and $NH_4OH$. According to the next step of the process, a first portion of the water stream formed in the second gas-liquid separating zone is subjected to conditions designed to strip $NH_3$ and produce an overhead vapor stream containing $NH_3$ and $H_2O$ and a bottom water stream which is substantially free of ammonia and sulfide and which contains a minor amount of $(NH_4)_2S_2O_3$. A first portion of the bottom water stream from this ammonia stripping step is then withdrawn from the process in order to remove the net amount of $(NH_4)_2S_2O_3$ formed in the two reaction steps. A second portion of this bottom water stream from the ammonia-stripping step is then charged to a second gas-liquid scrubbing zone wherein it is utilized to scrub $H_2S$ and $NH_3$ from the gas streams produced in the first and second gas-liquid separating zones. Thereafter, the ammonia- and sulfide-rich bottom stream from this second scrubbing zone is charged to the first reaction zone as the third recycle water stream. The second recycle water stream is then reecovered as another portion of the bottom water stream withdrawn from the ammonia-stripping step and passed to the first scrubbing zone. Lastly, the first recycle water stream is prepared by condensing at least a portion of the overhead vapor stream from the ammonia stripping step to form an ammoniacal water stream which is then combined with a second portion of the water stream withdrawn from the second gas-liquid separating zone and the resulting water stream is passed to the first scrubbing zone.

Other embodiments and objects of the present invention encompass details about particular input streams, output streams, and the mechanics associated with each of the essential and preferred steps thereof. These are hereinafter disclosed in the following detailed discussion of the present invention.

The invention will be further described with reference to the attached drawing which is a schematic outline of the process under discussion. The attached drawing is merely intended as a general representation of a preferred flow scheme with no intent to give details about vessels, heaters, condensers, pumps, compressors, valves, process control equipment, etc., except where a knowledge of these devices is essential to the understanding of the present invention or would not be self-evident to one skilled in the gas treating art.

Referring now to the attached drawing, a gas stream containing $H_2S$ enters the process through line 1 and is charged to the lower region of the first scrubbing zone, zone 2. The gas stream may be derived from a number of different sources and may be a coal gas, an oil gas, a water gas, a natural gas, a refinery gas and the like gas streams. In order to avoid confusion, some of the various type of gas streams which can be charged to this process are defined as follows: (1) coal gas is a mixture of gases produced by the destructive distillation of coal; (2) an oil gas is a gas derived from petroleum by the interaction of oil vapors and steam at high temperatures; (3) a water gas, or a synthesis gas as it is sometimes called, is a gas made of decomposing steam by passing it over a bed of incandescent coke or coal, and in some cases it is made by the high temperature reduction of steam with natural gases or similar hydrocarbons; (4) a natural gas is a mixture of low molecular weight paraffin hydrocarbons—typically $C_1$–$C_4$; (5) a refinery gas is a mixture of low molecular weight hydrocarbon and/or hydrogen gases produced in converting and distilling hydrocarbons. In all cases, the gas stream to be treated by the present invention will contain $H_2S$ in an amount ranging from about 0.01 mole percent up to about 50 mole percent or more. Typically, the amount of $H_2S$ contained in this gas stream will be about 1 to about 15 mole percent. In addition, in some cases the gas stream may contain ammonia, and in this case the present invention will also substantially remove and recover the ammonia from the gas stream.

Zone 2 is preferably a vertically positioned tower containing suitable means for achieving intimate contact between a gas stream and a liquid stream. Suitable contacting means are trays, plates, baffles or any other suitable packing material such as Raschig rings known to those skilled in the art. Zone 2 is conveniently divided into three regions: a bottom region where the input gas stream enters; a middle region where a first recycle water stream enters, and a top region where a second recycle water stream is injected. The input gas stream is charged via line 1 to the bottom region of zone 2 where it intimately contacts a descending water stream which is a mixture of the first recycle water stream, which is injected via line 18, and a second recycle water stream, which enters zone 2 by means of line 24. As indicated hereinbefore, it is an essential feature of the present invention that the first recycle water stream contains $NH_4OH$ and that the second recycle water stream is substantially free of $NH_4OH$. The amount of $NH_4OH$ contained in the first recycle water stream may range from about 1 wt. percent up to about 50 wt. percent or more. In general, it is necessary to inject sufficient $NH_3$ into zone 2 via line 18 to provide at least one mole of $NH_3$ per mole of $H_2S$ entering zone 2 via line 1, and, more preferably, about 1 to about 5 or more moles of $NH_3$ per mole of $H_2S$. Accordingly, for a particular $H_2S$ loading on zone 2, the $NH_4OH$ concentration and operating conditions are selected to provide an $NH_3/H_2S$ mole ratio within the specified range and to reduce the $H_2S$ content of treated gas stream to the desired low level which typically is of the order of 10 to 500 vol. p.p.m. of the exit gas stream leaving zone 2 by means of line 3.

In the upper region of zone 2 the partially scrubbed gas stream is countercurrently contacted with the second recycle water stream under conditions designed to remove substantially all volatilized $NH_3$ from the gas stream. This second recycle water stream is substantially free of $NH_3$—typically less than 300 wt. p.p.m.—because it is a portion of the bottom water stream from ammonia stripping zone 20 as is explained hereinafter. The rate of circulation of this second recycle water stream is generally conveniently selected for a particular input gas stream and $NH_3/H_2S$ loading on the basis of a simple experiment designed to determine the amount required to keep the treated gas stream withdrawn from the top of zone 2 substantially free of $NH_3$. Generally, good results are obtained when the amount of the second recycle water stream is about 0.5 to about 10 times the amount of the first recycle water stream on a volume basis, with a preferred value being selected from the range of about 1.5:1 to about 4:1.

Regarding the scrubbing conditions utilized in zone 2, it is preferred to operate this zone at a relatively low temperature and relatively high pressure. Typically, good results are obtained at a temperature of 50° F. to about 150° F. and a pressure ranging from about 1 to about 500 atmospheres. For example, excellent results are obtained at a temperature of about 70° F. and a pressure of about 10 atmospheres.

Following contact of the gas stream with the two recycle water streams, a treated gas stream is withdrawn from the upper region of zone 2 by means of line 3 and vented from the system. Similarly, an aqueous bottom stream containing $NH_4HS$ and typically some unreacted $NH_4OH$ is withdrawn from the bottom region thereof via line 4. Although it is not essential, in a case where very dilute gas streams are being treated in zone 2, the bottom stream therefrom may be advantageously further treated to concentrate the $NH_4HS$ contained therein to yield a water stream containing about 3 to 15 wt. percent sulfur as $NH_4HS$. Generally, this concentration step can be easily effected by stripping $NH_3$ and $H_2S$ from the bottom stream and redissolving the resulting gas stream in the required quantity of water or by recirculating at least a portion of this bottom stream around the lower region of zone 2. However, in most cases the amount of $NH_4HS$ contained in this bottom stream is sufficient to allow the direct passage of it to first reaction zone 5 as is shown in the drawing. This is especially true when the amount of unreacted sulfide recycled to zone 5 via line 28 is sufficient to increase the concentration of sulfide in the combined water stream charged to zone 5 to about 3 to 15 wt. percent thereof.

Accordingly, in the embodiment disclosed in the drawing, the aqueous bottom stream from zone 2 is passed via line 4 to the junction of line 11 with line 4 where it is commingled with a first air stream, the resulting gas-liquid mixture is then combined with a third recycle water stream at the junction of line 4 with line 28 and the mixture of the three streams passed to first reaction zone 5. The amount of oxygen contained in this first air stream is selected so that ammonium polysulfide is formed within zone 5. In order to effect polysulfide formation in zone 5, the amount of oxygen injected into this zone must be carefully regulated so that oxygen is reacted therein in an amount less than the stoichiometric amount required to oxidize all of the ammonium hydrosulfide salt charged to this zone to elemental sulfur. Since the stoichiometric amount of oxygen is 0.5 mole of oxygen per mole of sulfide, it is essential that the amount of oxygen charged to the treatment zone is sufficient to react less than 0.5 mole of $O_2$ per mole of sulfide, and, preferably, about 0.25 to about 0.45 mole of oxygen per mole of sulfide salt. It is especially preferred to operate with an amount of oxygen sufficient to react about 0.4 mole of oxygen per mole of sulfide charged to this zone. Accordingly, the amount of oxygen, charged to zone 5 via lines 10 and 11 is selected such that sufficient unreacted sulfide remains available to form a water-soluble ammonium polysulfide with the elemental sulfur which is the product of the primary oxidation reaction. Since 1 mole of sulfide will react with many atoms of sulfur (for ammonium polysulfide it is typically about 4 atoms of sulfur per mole of sulfide), it is generally only necessary that a small amount of sulfide remain unoxidized.

According to the present invention, the aqueous bottom stream from zone 2 is passed to zone 5 wherein it is catalytically treated with oxygen at oxidizing conditions selected to produce an effluent stream containing ammonium polysulfide, $NH_4OH$, $(NH_4)_2S_2O_3$, $H_2O$, $N_2$ and typically same unreacted $NH_4HS$. A feature of the present invention is the commingling of the water stream feed to zone 5 with a third recycle water stream containing unreacted sulfide recovered from the effluent stream from reaction zone 5. This third recycle water stream may be commingled with the aqueous bottom stream from zone 2 prior to its being passed into the first reaction zone as is shown in the drawing; on the other hand, the recycle water stream can be injected into the treatment zone at a plurality of injection points spaced along the direction of flow of the bottom stream through the first reaction zone. The principal advantage of this latter procedure is that the recycle water stream acts as a quench stream for the exothermic reactions taking place within the first reaction zone. Another advantage associated with use of the third recycle water stream is that the concentration of $NH_4HS$ charged to the first reaction zone is increased. Since it has been determined that the selectivity of the oxidation reaction occurring in zone 5 for elemental sulfur increases with the concentration of sulfide charged to this first oxidation step, the presence of sulfide in the recycle stream can be used to increase the selectivity for sulfur in zone 5. In fact, it is a preferred procedure to use the third recycle water stream to maintain the concentration of ammonium hydrosulfide in the combined water stream charged to zone 5 at about 3 to about 15 wt. percent calculated as elemental sulfur.

The oxidation catalysts utilized in first reaction zone 5 and in subsequently described second reactor zone 12 can be any suitable solid catalyst that is capable of accelerating the oxidation of ammonium hydrosulfide to elemental sulfur. Two particularly preferred classes of catalyst for these two oxidation steps are metallic sulfides, particularly iron group metallic sulfides, and metal phthalocyanines. It is to be recognized that it is not necessary to use the same type of catalyst in zones 5 and 12; however, operations are often simplified if the same type of catalyst is utilized.

The preferred metallic sulfide catalyst is selected from the iron group sulfides; that is the sulfides of nickel, cobalt, and iron, with nickel sulfide being especially preferred. Although it is possible to perform this oxidation step with a slurry of metallic sulfide particles, it is preferred that the metallic sulfide be combined with a suitable carrier material. Examples of suitable carrier materials are: charcoals, such as wood charcoal, bone charcoal, etc., which charcoals may or may not be activated prior to use; refractory inorganic oxides such as alumina, silica, zirconia, bauxite, etc.; activated carbons such as those commercially available under trade names of Norit, Nuchar, and Darco and other similar carbon materials familiar to those skilled in the art. In addition, other natural or synthetic highly porous inorganic carrier materials such as various forms of clay, kieselguhr, etc., may be used if desired. The preferred carrier materials for the metallic sulfide catalyst are alumina, particularly alpha-, gamma-, and eta-alumina, and activated charcoal. Thus, nickel sulfide combined with alumina or nickel sulfide combined with activated carbon are particularly preferred catalysts for the oxidation step. In general, the metallic sulfide is preferably combined with the carrier material in an amount which is catalytically effective; typically good results are obtained with an amount sufficient to result in a final composite containing about 0.1 to about 30 or more wt. percent of the metallic component, calculated as the elemental metal. For the preferred nickel sulfide catalyst, excellent results are obtained with about 1 to about 15 wt. percent nickel as nickel sulfide on an activated carbon support or on an alumina support.

An especially preferred catalyst for use in the oxidation steps of the present invention is a metal phthalocyanine compound combined with a suitable carrier material. Particularly preferred metal phthalocyanine compounds include those of cobalt and vanadium. Other metal phthalocyanine compounds that may be used include those of iron, nickel, copper, molybdenum, manganese, tungsten, and the like. Moreover, any suitable derivative of the metal phthalocyanine may be employed including the sulfonated derivatives and the carboxylated derivatives. Any of the carrier materials previously mentioned in connection with the metallic sulfide catalysts can be utilized with the phthalocyanine compound; however, the preferred carrier material is activated carbon. Hence, a particularly preferred catalyst for use in the oxidation step comprises a cobalt or vanadium phthalocyanine sulfonate combined with an activated carbon carrier material. Additional details as to alternative carrier materials, methods of preparation, and the preferred amounts of catalytic components are given in the teachings of U.S. Pat. No. 3,108,081 for these phthalocyanine catalysts.

Although operation of zone 5 can be performed according to any of the methods taught in the art for simultaneously contacting a liquid stream and a gas stream with a solid catalyst, the preferred procedure involves a fixed bed of the solid catalyst disposed in the treatment zone. The aqueous bottom stream from zone 2 is then passed therethrough in either upward, radial, or downward flow and the air stream is charged in either concurrent or countercurrent flow relative to the water stream. The preferred procedure is to operate downflow with both streams being charged in concurrent fashion. Because one of the products of this oxidation step is elemental sulfur, there is a substantial catalyst contamination problem caused by the deposition of this elemental sulfur on the fixed bed of the catalyst. In order to avoid sulfur deposition on the catalyst, it is necessary to operate so that the net sulfur made in this zone is reacted with excess sulfide to form a water-soluble ammonium polysulfide.

Regarding the oxidizing conditions utilized in first reaction zone 5, it is preferred to utilize a temperature in the range of about 75 to about 200° F., with a temperature of about 100 to about 175° F. yielding best results. The sulfide oxidation reaction is not too sensitive to pressure, and, accordingly, any pressure which maintains the water stream charged to zone 5 substantially in the liquid phase may be utilized. In general, it is preferred to operate at the lowest possible pressure which is sufficient to maintain the elemntal sulfur in combination as the water-soluble ammonium polysulfide, and although pressure of about 1 to about 30 p.s.i.g. may be used, a pressure of about 1 to about 20 p.s.i.g. is particularly preferred. Additionally, it is preferred to operate on the basis of a combined stream liquid hourly space velocity which is defined as the volume charge rate per hour of the aqueous bottom stream from zone 2 plus the third recycle water stream divided by a total volume of the catalyst bed. This parameter is preferably selected from the range of about 0.1 to about 20 hr.$^{-1}$, with a value of about 1 to 10 hr.$^{-1}$ giving best results.

An effluent stream is then withdrawn from zone 5 via line 6 and found to contain ammonium polysulfide, $NH_4OH$, $(NH_4)_2S_2O_3$, $H_2O$, $N_2$, in many cases unreacted $NH_4HS$ and typically some unreacted $O_2$. This stream is passed via line 6 to first gas-liquid separating zone 7 and therein separated into a gas stream, withdrawn via line 8, containing $N_2$, $H_2O$, $H_2S$, $NH_3$, and typically same unreacted $O_2$ and a liquid stream, withdrawn via line 9, containing ammonium polysulfide, $NH_4OH$, $(NH_4)_2S_2O_3$, $H_2O$ and typically some unreacted $NH_4HS$. This first separation step is preformed at about the temperature and pressure maintained at the outlet from the first oxidation step. It is to be noted that this first separation sep can be performed in the lower region of first reaction zone 5 if desired by use of a suitable baffling arrangement.

The liquid stream from first separation zone 7 is then passed via line 9 to the junction of line 10 with line 9 wherein it is commingled with a second air stream which enters the systems via line 10. The resulting mixture of air and liquid is then heated to the desired conversion temperature by heating means (not shown) and passed into second reaction zone 12. As previously explained, zone 12 contains a fixed bed of a solid oxidation catalyst of the type already characterized.

The function of second reaction zone 12 is to selectively oxidize the ammonium polysulfide contained in the liquid stream charged thereto to liquid sulfur while minimizing the formation of undesired by-products—primarily $(NH_4)_2S_2O_3$. Second reaction zone 12 is operated at oxidizing conditions designed to accomplish this function. They are in general relatively more severe than those utilized in the first reaction zone, and typically include: (1) a temperature greater than or equal to the melting point of sulfur—that is a temperature of at least 235° F. and more typically about 235 to about 325° F., with best results obtained at a temperature of about 235 to about 265° F.; (2) a pressure sufficient to maintain at least a portion of the liquid stream from the first separating zone in the liquid phase—although any pressure meeting this requirement can be used, it is distinctly preferred to utilize a pressure which is quite close to the minimum pressure required to maintain a liquid phase at the temperature selected; thus an especially preferred pressure is one that is about 1 to about 1.5 times this minimum pressure; (3) a liquid hourly space velocity selected from the range of about 0:5 to about 10 hr.$^{-1}$. For example, excellent results have been obtained when this second reaction zone is operated at a temperature of about 235 to 265° F., a reactor pressure of about 20 to 40 p.s.i.g. and a liquid hourly space velocity of about 1 to 5 hr.$^{-1}$. Zone 12 is operated in a manner similar to zone 5 insofar as mechanics of contacting the input stream with the catalyst are concerned.

The amount of oxygen charged to zone 12 by means of the second air stream is preferably an amount less than that utilized in the first reaction zone. Typically, the amount of oxygen reacted in this second oxidation step is not greater than 2 times the stoichiometric amount required to completely oxidize all the sulfide contained in the liquid stream from the first separating zone to sulfur; in fact best results are ordinarily obtained at an oxygen to sulfide mole ratio corresponding to about 0.5:1 to about 0.9:1.

After the desired reaction between oxygen and ammonium polysulfide is accomplished in zone 12, an effluent stream containing $(NH_4)_2S_2O_3$, $NH_4OH$, $H_2O$, $N_2$ and possibly a minor amount of unreacted $O_2$ is withdrawn therefrom and passed via line 14 to second separting zone 15. It is to be noted that it is a feature of the operation of zone 12, that the effluent stream withdrawn therefrom will be substantially free of sulfide; this is primarily caused by the high temperature utilized therein which greatly accelerates the oxidation of sulfide. In fact, the principal by-product of the reaction occurring in zone 12 is $(NH_4)_2S_2O_3$. It is typically formed therein in an amount corresponding to about 10 to 40% of the sulfide charged to zone 12.

Also withdrawn from zone 12 via line 13 is a liquid sulfur stream which is the principal product stream of the present process. Since zone 12 is operated at conditions which insure that any sulfur found therein is liquid and since liquid sulfur is readily separable from the rest of the products of the reaction occurring in zone 12, it is generally a preferred practice to allow a liquid sulfur phase to separate from a water phase in the bottom of zone 12, although the sulfur separation can be performed in a separate separating zone such as zone 15 if desired. This sulfur stream is not contaminated with any salts, catalysts or other undesirable ingredients and is essentially 99% pure bright sulfur.

Second separating zone 15 is operated in a manner similar to the first separating zone to form a gas stream, withdrawn via line 16, containing $N_2$, $H_2O$ and $NH_3$ and a substantially sulfide-free water stream, withdrawn via line 17, containing $(NH_4)_2S_2O_3$ and $NH_4OH$. Once again this separation can be allowed to occur within the bottom region of zone 12 by using suitable baffling means if desired. In this latter case zone 15 would then of course be the lower region of zone 12. In some cases, the effluent stream from zone 12 can be cooled by suitable means (not shown) to a temperature of about 25 to about 200° F. before being sent to separating zone 15. Zone 15 is typically operated at a pressure which approximates that used in zone 12.

The substantially sulfide-free water stream formed in zone 15 is withdrawn therefrom via line 17 and split into two portions at the junction of line 18 with line 17. The first portion of this steram continues on via line 17 to stripping zone 20. The second portion of this water stream is recirculated to first scrubbing zone 2 via line 18 as the first recycle water stream after it is combined with a portion of the ammonical water stream formed in subsequently described zone 20.

The function of stripping zone 20 is to strip $NH_3$ from the first portion of the water stream from the second separating zone. Since ammonia is a relatively volatile substance, this stripping operation is rather easily accomplished. Obviously, the temperature utilized should be relatively high and the pressure relatively low; specific stripping conditions are well known to those skilled in the art. Suitable heating means, such as a reboiler, a steam coil or the like, can be utilized to maintain the bottom of zone 20 at the desired stripping temperature. The stripping gas utilized can be generated in situ by heating means designed to generate upflowing water vapors or can be supplied from an external source. Regardless of how zone 20 is operated, an overhead vapor stream, withdrawn via line 21, containing $NH_3$ and $H_2O$ will be produced therein in an amount sufficient to take substantially all the entering ammonia overhead. The bottom water stream, withdrawn from zone 20 via line 23, will consequently contain a minor amount $(NH_4)_2S_2O_3$ but otherwise be substantially free of ammonia and sulfide.

At least a portion of the overhead vapor stream from zone 20 is preferably condensed (by means not shown) to form an ammoniacal water stream, a part of which can be recirculated to stripping zone 20 as reflux via line 30 and another part of which is passed via line 21 and 22 to the junction of line 22 with line 18 whereat it is combined with a second portion of the water stream from zone 15 in order to form the first recycle water stream. The return of this ammonia stream to admixture with the second portion of the water stream from zone 15 is necessary order to maintain the proper amount of $NH_4OH$ is the regenerated absorbent stream because the amount of $NH_3$ taken overhead in zone 20 is determined not by $NH_3$ product requirements (if any) but on the need for an ammonia-free water stream for use in zones 2 and 26. Of course if $NH_3$ is present in the gas stream treated in zone 2 then a portion of the overhead vapor stream produced in zone 20 is withdrawn from the system via line 21 as an ammonia product stream. In general it is preferred to withdraw the ammonia product stream after a portion of same is condensed because this procedure acts to enrich the ammonia product stream withdrawn from the system by means of line 21. Of course where $NH_3$ is not present in the input gas stream entering the system via line 1 then line 21 is blocked off and makeup $NH_3$ or $NH_4OH$ must be continuously added to the system via line 19 in order to make up for that lost from the system in the form of the $(NH_4)_2S_2O_3$ by-product and the inevitable small losses in the vent gas streams.

The bottom water stream from $NH_3$-stripping zone 20 is withdrawn therefrom via line 23. A first portion of this stream is withdrawn from the system via line 23 in order to remove the net production of $(NH_4)_2S_2O_3$ from the system and at least a portion of the net $H_2O$ formed by the oxidation reactions occurring in reaction zones 5 and 12. In the case where the input gas stream in line 1 or the air stream entering via line 10 are not saturated with water then a portion of the net water product of the system will be withdrawn from the system in the treated gas leaving via line 3 and in $N_2$ vent gas stream in line 27. In some cases $H_2O$ losses in these vent gas streams may be so high that it may be necessary to add makeup water to the system, typically via line 29 in order to make up for that lost via lines 3 and 27.

The major portion of the bottom water stream from zone 20 flows via line 23 and 24 to junction of lines 24 and 25 where it is divided into a second and third portion. The second portion of this substantially $NH_3$ and $H_2S$-free water stream is then passed to second scrubbing zone 26 via line 25. The third portion continues on via line 24 to the upper region of zone 2 as the second recycle water stream where it is used in the manner previously explained.

Turning now to the operation of second scrubing zone 26, it can be ascertained from the drawing that the gas streams produced in gas-liquid separating zones 7 and 15 are also charged thereto via lines 8 and 16 respectively. The scrubbing liquid for this zone is a portion of the bottoms water stream from $NH_3$-stripping zone 20 which enters zone 26 via line 25 as previously discussed. The function of zone 26 is to recapture the $NH_3$ and $H_2S$ present in the vent gas streams from the separating zones. Actually only $NH_3$ is present in any substantial amount in the gas stream from zone 15 because of the essentially complete oxidation occurring in zone 12. Zone 26 may be operated in a number of different modes depending upon the economics of the particular application. In one mode of operation (shown in the drawing) both gas streams are combined at the junction of lines 8 and 16 and the resulting mixture passed into a single vertically positioned scrubbing vessel. In a second mode of operation of zone 26, two separate scrubbing vessels are provided with the scrubbing liquid being divided between them and the gas streams being separately treated in them. The principal advantage associated with this second mode is that the gas stream from zone 15 is available at a relatively higher pressure than that from zone 7 so that the separate scrubbing of the former stream can be conducted in a smaller vessel in a more efficient manner; however, this is counterbalanced by the additional capital investment required for the additional scrubbing vessel. In a third mode of operation of zone 26, two separate vessels are provided as in the second mode with the gas streams separately charged to them. However, all of the scrubbing liquid from line 25 is passed to one of the vessels with the bottom water stream from this vessel being used as the scrubbing fluid in the other vessel. Regardless of which mode of operation is utilized in zone 26, it preferably contains suitable contacting means for achieving intimate contact between the input gas and liquid streams. This zone is operated at countercurrent scrubbing conditions, typically including a relatively low temperature and relatively high pressure (if possible), and a liquid to gas loading (or circulation rate) sufficient to produce an $N_2$-rich vent gas stream which is substantially free of $NH_3$ and $H_2S$. The vent gas stream is withdrawn from zone 26 via line 27 and vented from the system. The aqueous bottom stream from zone 26 contains $NH_4OH$, $(NH_4)_2S_2O_3$ and $NH_4HS$. It is withdrawn therefrom via line 28 and passed via lines 28 and 4 to the first reaction zone 5 as the third recycle water stream as pointed out supra. This third recycle water stream will contain substantially all of the $NH_3$ and $H_2S$ flashed off in separating zones 7 and 15.

During start-up of the process, the necessary inventory of water containing $NH_4OH$ is injected into the system via line 19. Likewise the inventory of ammonia- and sulfide-free water necessary for start-up is injected via line 29.

Typical results obtained with the present process are: (1) a conversion of sulfide in first reaction zone 5 of about 60 to 90% at a selectivity for elemental sulfur (combined as polysulfide) of 80 to 95%; (2) a conversion of sulfide in second reaction zone 12 of about 95 to 100% at a selectivity for sulfur of about 60 to 80%; and (3) on an overall basis, a conversion of about 80 to 95% or more of the sulfide present in the bottom water stream from zone 2 at a selectivity for elemental sulfur of about 85 to 95% thereof.

It is intended to cover by the following claims, all changes and modifications of the above disclosure of the present invention which would be self evident to a man of ordinary skill in the gas treating art.

I claim as my invention:

1. A continuous, closed-loop process for treating a gas stream containing $H_2S$ and for producing elemental sulfur therefrom, said process comprising the steps of:
   (1) introducing said gas stream into the lower region of a first gas scrubbing zone, introducing a first recycle water stream containing $NH_4OH$ into the middle region of the first scrubbing zone, and introducing a second recycle water stream which is substantially free of ammonia and sulfide into the first scrubbing zone at a point above the point of introduction of said first recycle stream;
   (2) maintaining said first scrubbing zone under countercurrent gas-liquid contact conditions selected to produce a gaseous overhead stream which is substantially reduced in $H_2S$ content and is substantially free of $NH_3$, and an aqueous bottom stream containing $NH_4HS$;
   (3) reacting at least a portion of the aqueous bottom stream from step (2), a first air stream, and a third recycle water stream containing $(NH_4)_2S_2O_3$, $NH_4OH$ and $NH_4HS$ with a solid catalyst at oxidizing conditions selected to form an effluent stream containing ammonium polysulfide, $(NH_4)_2S_2O_3$, $NH_4OH$, $H_2O$ and $N_2$;
   (4) separating the effluent stream from step (3) into a gas stream containing $N_2$, $H_2O$, $H_2S$, and $NH_3$, and a liquid stream containing ammonium polysulfide, $NH_4OH$, $H_2O$, and $(NH_4)_2S_2O_3$;
   (5) reacting the liquid stream from step (4) and a second air stream with a solid catalyst at oxidizing conditions, including a temperature greater than or equal to the melting point of sulfur and a pressure sufficient to maintain the liquid stream from step (4) in the liquid state, selected to form a liquid sulfur stream and an effluent stream containing $(NH_4)_2S_2O_3$ $NH_4OH$, $H_2O$ and $N_2$;
   (6) separating the effluent stream from step (5) into a gas stream containing $N_2$, $H_2O$ and $NH_3$ and a substantially sulfide-free water stream containing $(NH_4)_2S_2O_3$ and $NH_4OH$;

(7) stripping NH₃ from a first portion of the water stream formed in step (6) to yield an overhead vapor stream containing NH₃ and H₂O and a bottom water stream which is substantially free of ammonia and sulfide and which contains a minor amount of $(NH_4)_2S_2O_3$;

(8) withdrawing a first portion of the bottom water stream produced in step (7) from the process in order to remove the net amount of $(NH_4)_2S_2O_3$ formed in the process;

(9) contacting a second portion of the bottoms water stream from step (7) with the gas stream from step (4) and the gas stream from step (6), in a second gas scrubbing zone, at countercurrent gas-liquid contact conditions selected to form a nitrogen-rich overhead vent gas stream and an aqueous bottom stream containing $NH_4OH$, $(NH_4)_2S_2O_3$ and $NH_4HS$;

(10) passing the aqueous bottom stream from step (9) to step (3) as the third recycle water stream;

(11) passing a third portion of the bottom water stream from step (7) to step (1) as the second recycle water stream;

(12) condensing at least a portion of the overhead vapor stream from step (7) to form an ammoniacal water stream; and

(13) combining at least a portion of the ammoniacal water stream formed in step (12) with a second portion of the water stream formed in step (6) to form the first recycle water stream and passing some to step (1).

2. A process as defined in claim 1 wherein the gas stream charged to step (1) contains H₂S and NH₃ and wherein a portion of the overhead vapor stream from step (7) is withdrawn from the process as an ammoniacal product stream.

3. A process as defined in claim 1 wherein the solid catalysts utilized in steps (3) and (5) comprise a phthalocyanine compound.

4. A process as defined in claim 1 wherein the solid catalysts utilized in steps (3) and (5) comprise an iron group metallic sulfide combined with a carrier material.

5. A process as defined in claim 4 wherein the iron group metallic sulfide is nickel sulfide.

6. A process as defined in claim 1 wherein the amount of air charged to step (3) is sufficient to react about 0.4 moles of oxygen per mole of sulfide charged to said step.

7. A process as defined in claim 1 wherein the solid catalysts utilized in steps (3) and (5) comprise cobalt phthalocyanine monosulfonate combined with an activated carbon or alumina carrier material.

8. A process as defined in claim 1 wherein the gas stream charged to step (1) is a coal gas containing H₂S and NH₃.

9. A process as defined in claim 1 wherein the gas stream charged to step (1) is a water gas or a synthesis gas containing H₂S and NH₃.

10. A process as defined in claim 1 wherein the gas stream charged to step (1) is a natural gas containing H₂S.

11. A process as defined in claim 1 wherein the gas stream charged to step (1) is a refinery gas containing H₂S.

12. A process as defined in claim 1 wherein the oxidizing conditions utilized in step (3) include a temperature of about 75 to about 200° F. and a pressure of about 1 to about 30 p.s.i.g.

13. A process as defined in claim 1 wherein the temperature utilized in step (5) is about 235 to about 325° F.

14. A process as defined in claim 1 wherein the pressure utilized in step (5) is about 1 to about 1.5 times the minimum pressure required to hold water in the liquid phase at the specific temperature utilized.

15. A process as defined in claim 1 wherein the pressure utilized in step (5) is just sufficient to maintain at least a portion of the liquid stream from step (4) in the liquid state.

16. A process as defined in claim 1 wherein the oxidizing conditions utilized in step (3) include a temperature of about 100 to about 175° F. and a pressure of about 1 to about 20 p.s.i.g.

17. A process as defined in claim 1 wherein the oxidizing conditions utilized in step (5) include a temperature of about 235 to about 265° F. and a pressure of about 20 to about 40 p.s.i.g.

References Cited
UNITED STATES PATENTS

| | | | |
|---|---|---|---|
| 3,365,374 | 1/1968 | Short et al. | 23—181 X |
| 3,457,046 | 7/1969 | Hoekstra | 23—224 |
| 3,627,470 | 12/1971 | Hamblin | 23—224 |

OSCAR R. VERTIZ, Primary Examiner

G. O. PETERS, Assistant Examiner